(12) United States Patent
Fujiwara et al.

(10) Patent No.: US 11,825,210 B2
(45) Date of Patent: Nov. 21, 2023

(54) APPARATUS, CONTROL METHOD, AND STORAGE MEDIUM

(71) Applicant: CANON KABUSHIKI KAISHA, Tokyo (JP)

(72) Inventors: Yuya Fujiwara, Kanagawa (JP); Seigo Kaneko, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/828,695

(22) Filed: May 31, 2022

(65) Prior Publication Data

US 2022/0394224 A1 Dec. 8, 2022

(30) Foreign Application Priority Data

Jun. 4, 2021 (JP) .................................. 2021-094252

(51) Int. Cl.
*H04N 23/88* (2023.01)
*H04N 23/73* (2023.01)
*H04N 23/76* (2023.01)

(52) U.S. Cl.
CPC ............ *H04N 23/88* (2023.01); *H04N 23/73* (2023.01); *H04N 23/76* (2023.01)

(58) Field of Classification Search
CPC .... H04N 1/6077; H04N 1/6086; H04N 23/73; H04N 23/88; H04N 25/50
USPC ........................................... 348/223.1, 229.1
See application file for complete search history.

(56) References Cited

U.S. PATENT DOCUMENTS 7,236,190 B2 * 6/2007 Yanof .................. H04N 25/134
348/222.1
2021/0392274 A1 * 12/2021 Sendik ................... H04N 23/76

FOREIGN PATENT DOCUMENTS

| CN | 105611265 A | * | 5/2016 | ............ H04N 9/73 |
| CN | 108377372 A | * | 8/2018 | ............ H04N 9/045 |
| EP | 1814319 A1 | * | 8/2007 | ........... H04N 5/2351 |
| JP | 2000295632 A | | 10/2000 | |
| JP | 2002271810 A | * | 9/2002 | ............... H04N 9/73 |
| WO | WO-2018118597 A1 | * | 6/2018 | ........... H04N 5/2226 |

* cited by examiner

*Primary Examiner* — Anthony J Daniels
(74) *Attorney, Agent, or Firm* — CANON U.S.A., INC. IP Division

(57) ABSTRACT

An apparatus includes a capturing unit configured to capture an image of an object, an exposure control unit configured to control an exposure condition including an exposure time or an analog gain for each of a plurality of pixels or pixel groups on a surface of the capturing unit, a determination unit configured to determine one or more evaluation areas including an achromatic color area from the captured image, a calculation unit configured to calculate a first evaluation value for each of the plurality of pixels or pixel groups in the evaluation area, and calculate a second evaluation value based on the first evaluation value weighted based on the exposure condition for each of the plurality of pixels or pixel groups, a correction unit configured to correct the image based on the second evaluation value.

18 Claims, 9 Drawing Sheets

FIG. 4

| EXPOSURE CONDITION G | WEIGHTING VALUE α |
|---|---|
| G1 < G ≤ G2 | A1 |
| G2 < G ≤ G3 | A2 |
| ... | ... |
| Gn < G ≤ Gn+1 | An |

FIG. 5

| EXPOSURE AREA | EXPOSURE CONDITION GAIN G | WEIGHTING VALUE FORMULA (1) α=1/2G | WHITE BALANCE EVALUATION VALUE 1 $W_i$ | WHITE BALANCE EVALUATION VALUE 2 |
|---|---|---|---|---|
| 1 | 0 | 1 | $W_1$ | W |
| 2 | 1 | 0.5 | $W_2$ | |
| 3 | -1 | 2 | $W_3$ | |
| 4 | 0 | 1 | $W_4$ | |

FIG. 8

| GAIN AREA | WEIGHTING VALUE α |
|---|---|
| LOW GAIN AREA G1 | A1 |
| HIGH GAIN AREA G2 | A2 |

( A1 > A2 )

APPARATUS, CONTROL METHOD, AND STORAGE MEDIUM

BACKGROUND

Technical Field

The aspect of the embodiments relates to an apparatus, a control method, and a storage medium.

Description of the Related Art

Japanese Patent Application Laid-open No. 2000-295632 discusses a technique of enhancing an accuracy of an evaluation value of a white balance by dividing an area into a plurality of areas and acquiring a correction value of the white balance from the area with a maximum luminance value.

SUMMARY

According to an aspect of the embodiment, an apparatus includes a capturing unit configured to capture an image of an object, a control unit configured to control an exposure condition including an exposure time or an analog gain for each of a plurality of pixels or pixel groups on a surface of the capturing unit, a determination unit configured to determine one or more evaluation areas including an achromatic color area from the captured image, a calculation unit configured to calculate a first evaluation value for each of the plurality of pixels or pixel groups in the evaluation area, and calculate a second evaluation value based on the first evaluation value weighted based on the exposure condition for each of the plurality of pixels or pixel groups, a correction unit configured to correct the image based on the second evaluation value.

Further features of the disclosure will become apparent from the following description of exemplary embodiments with reference to the attached drawings.

BRIEF DESCRIPTION OF THE DRAWINGS

FIG. 4 is a table illustrating exposure conditions and weighting values for the imaging apparatus according to the first exemplary embodiment of the disclosure.

FIG. 5 is a table illustrating exposure areas, exposure conditions, and white balance evaluation values for the imaging apparatus according to the first exemplary embodiment of the disclosure.

FIG. 8 is a correspondence table illustrating gain areas and weighting values for the imaging apparatus according to the second exemplary embodiment of the disclosure.

DESCRIPTION OF THE EMBODIMENTS

Hereinbelow, exemplary embodiments according to the disclosure will be described with reference to the attached drawings. The exemplary embodiments described below are merely examples to implement the disclosure, and should be modified or changed as appropriate depending on configurations or various conditions of apparatuses to which the disclosure is applied, and thus the disclosure is not limited to the exemplary embodiments described below. Further, a part of each of the exemplary embodiments described below may be combined as appropriate.

In a first exemplary embodiment, an achromatic color area is extracted from an image to determine an evaluation area for calculating an evaluation value of a white balance. A white balance evaluation value 1 (first evaluation value) is calculated for each pixel group in the evaluation area, and the white balance evaluation value 1 is weighted based on an exposure condition for each pixel group. A white balance evaluation value 2 (second evaluation value) is determined by weighting and averaging the weighted white balance evaluation values 1 in the evaluation area. A white balance of an overall image is corrected based on the white balance evaluation value 2. The white balance is described in the present exemplary embodiment, the evaluation value may be an evaluation value relating to a color correction for correcting a color saturation or a hue, in addition to the white balance.

<Functional Configuration>

Figure 1:
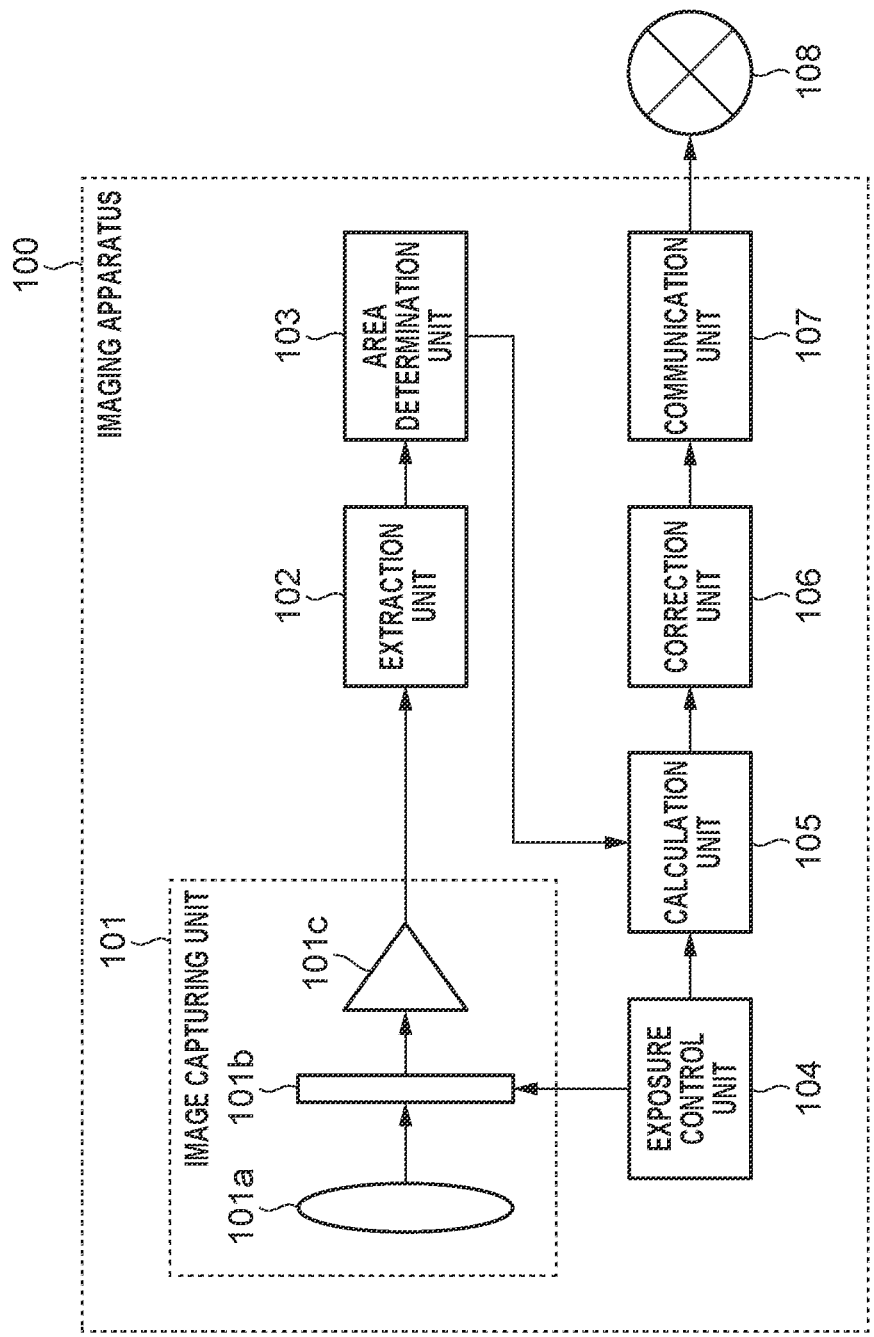
FIG. 1 is a block diagram illustrating a configuration example of an imaging apparatus according to a first exemplary embodiment of the disclosure.

FIG. 1 is a block diagram illustrating a configuration example of an imaging apparatus 100 according to the present exemplary embodiment. As for functional blocks to be implemented by software components among the functional blocks illustrated in FIG. 1, a program for implementing functional blocks is stored in a Read Only Memory (ROM). The functions thereof are implemented by a Central Processing Unit (CPU) reading the program from the ROM into a Random Access Memory (RAM) and executing the program. As for functional blocks to be implemented by hardware components, a dedicated circuit may be automatically generated on a Field Programmable Gate Array (FPGA) from a program for implementing the functional blocks using a predetermined compiler. Further, in a similar manner to the FPGA, the functional blocks may be implemented by generating a gate array circuit as a hardware component. Further, the functional blocks may be implemented by an Application Specific Integrated Circuit (ASIC). The configuration of the functional blocks illustrated in FIG. 1 is merely an example, and a plurality of functional blocks may constitute a functional block, or any of the functional block may be divided into blocks performing a plurality of functions.

In FIG. 1, the imaging apparatus 100 includes an image capturing unit 101, an extraction unit 102, an area determination unit 103, an exposure control unit 104, a calculation unit 105, a correction unit 106, and a communication unit 107.

The image capturing unit 101 includes a lens group 101a, an image sensor 101b, and an amplification unit 101c.

The image capturing unit 101 captures an image of an object based on light received from the object to generate an image. The lens group 101a focuses the light received from the object on a light receiving surface of the image sensor 101b. In FIG. 1, only one lens is illustrated as the lens group 101a. However, the lens group 101a may include a plurality of lenses, for example, a zoom lens, a focus lens, and an image shake correction lens. The image sensor 101b converts the light received from the object into an electrical signal for each pixel and outputs the electrical signal. The exposure condition can be changed for each pixel group including one or more pixels of the image sensor 101b (i.e., for each of a plurality of divided areas).

The image sensor 101b is configured of a semiconductor device such as a Charge Coupled Device (CCD) sensor or Complementary Metal Oxide Semiconductor (CMOS) sensor, and peripheral circuits. The amplification unit 101c amplifies an electrical signal output from the image sensor 101b to output the amplified electrical signal as a captured image signal. An amplification ratio of the amplification unit 101c can be changed for each pixel group. An image processing unit (not illustrated) performs image processing including development processing on the image signal (digital signal). The image signal is converted into image data in, for example, a Joint Photographic Experts Group (JPEG) format. At this time, the image signal including color information of red, green, and blue (RGB) output from the amplification unit 101c is converted into a color-difference signal in, for example, a YUV format, and subjected to digital signal processing. At the end, the image signal is converted (developed) into the image data to be output via an image output unit (not illustrated). The development processing includes a white balance correction, a saturation correction, a color correction (hue correction), a sharpness correction, a gamma correction, and a gradation correction. In the white balance correction, a white balance evaluation value (development parameter) is calculated from the image signal without using a fixed development parameter. The white balance correction is performed using the calculated development parameter. Further, the image processing unit (not illustrated) can calculate luminance information and color difference information by performing a YUV conversion. Further, the image processing unit performs a luminance correction of the image information corresponding to each pixel group based on the exposure condition for each pixel group.

The extraction unit 102 extracts an image area determined to be a white area from the image signal (color signal) having subjected to an analog-to-digital (A/D) conversion by the image processing unit (not illustrated). For example, the extraction unit 102 detects, as a white area, an image area of a pixel group the color evaluation value of which, calculated based on the image signal (RGB signal) obtained from each pixel group of the image sensor 101b, is included within a predetermined evaluation value range of the white area. The "white area" is not limited to the white area, and includes a gray area, i.e., an achromatic color area.

Figure 2:
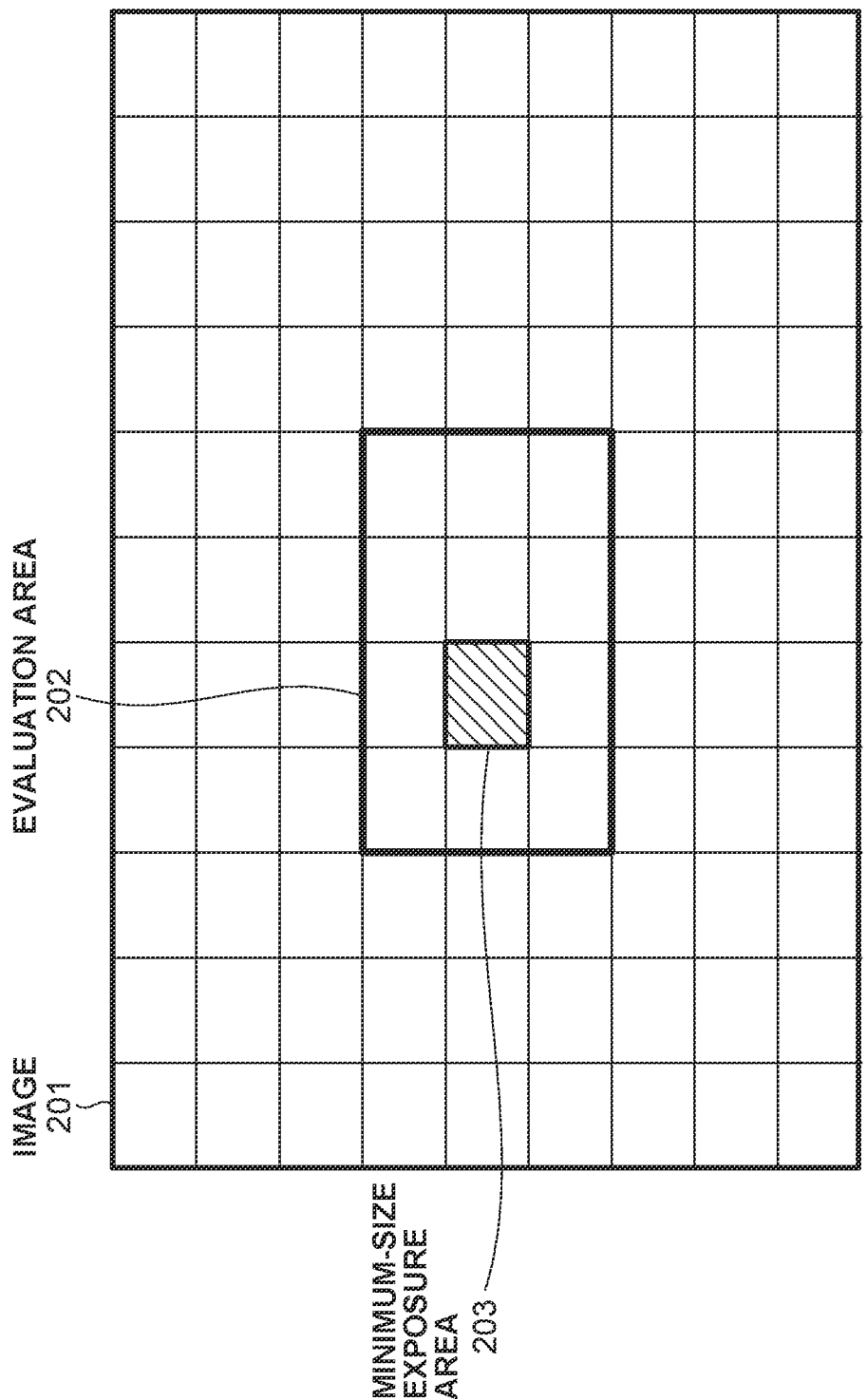
FIG. 2 is a diagram illustrating an image captured by the imaging apparatus according to the first exemplary embodiment of the disclosure.

The area determination unit 103 determines an area for calculating an evaluation value to correct a white balance on the image signal output from the image processing unit (not illustrated). FIG. 2 is an example of an image captured by the imaging apparatus 100 according to the present exemplary embodiment. An image 201 is an overall image the white balance of which is to be corrected. An evaluation area 202 is an area for calculating a white balance evaluation value 2 for correcting the white balance of the image 201. The evaluation area 202 may be the same area as the image 201 or may be determined based on the white area extracted by the extraction unit 102. A minimum-size exposure area 203 is an image area corresponding to the pixel group described above, and is a minimum area the exposure condition of which can be set for each area. The evaluation area 202 may be configured of a plurality of minimum-size exposure areas 203. In addition, in the present exemplary embodiment, a case where the image 201 includes one evaluation area 202 is described. However, the image 201 may include two or more evaluation areas as illustrated in a third exemplary embodiment described below.

The exposure control unit 104 controls an exposure value such as an exposure time and an analog gain for each pixel group.

The exposure control unit 104 assigns an exposure condition to each minimum-size exposure area 203 to control the image sensor 101b. The exposure control unit 104 sets the exposure condition so that an average luminance value in the minimum-size exposure area 203 becomes a median value of a data gradation that can be output therefrom, in order to improve a dynamic range of the luminance value of the object. In addition, the exposure control unit 104 controls a pixel group corresponding to the evaluation area 202 extracted by the extraction unit 102 or determined by the area determination unit 103 to have a longer exposure time and a lower analog gain than other pixel groups that are neither extracted nor determined. In this way, it is possible to obtain an evaluation value lower in noise amplification amount in calculation processing of the white balance evaluation value described below, and to perform a more accurate white balance correction.

The calculation unit 105 calculates a white balance evaluation value 2 in the evaluation area 202 determined by the area determination unit 103. More specifically, the calculation unit 105 calculates the white balance evaluation value 1 for each minimum-size exposure area 203 in the evaluation area 202, and calculates the white balance evaluation value 2 based on the weighting value based on an exposure condition assigned to each minimum-size exposure area 203. The calculation unit 105 may be divided into a first calculation unit and a second calculation unit, and the first calculation unit and the second calculation unit may respectively calculate the white balance evaluation value 1 and the white balance evaluation value 2.

The correction unit 106 corrects the white balance of the overall image based on the white balance evaluation value 2 calculated by the calculation unit 105. More specifically, the correction unit 106 corrects the white balance of the image by controlling a digital gain for each of a plurality of color signals in the image 201 based on the white balance evaluation value 2. The color signal here means RGB signals i.e., signals divided into three colors of red (R), green (G), and blue (B), or YUV signals, i.e., signals including one luminance signal and two-color difference signals (luminance (Y), difference of blue component (U), and difference of red component (V)). In addition, the correction unit 106 may perform a color saturation correction, a color correction, a sharpness correction, a gamma correction, and a gradation correction, not limited to the white balance correction.

The extraction unit 102, the area determination unit 103, the calculation unit 105, and the correction unit 106 may be included in the image processing unit (not illustrated).

The communication unit 107 transmits the image data captured by the imaging apparatus 100 to an external apparatus (not illustrated) such as a client apparatus and a server apparatus through communication via a network 108. Further, the communication unit 107 may receive a control signal from the external apparatus to the CPU through the communication, to control the units in the imaging apparatus 100.

<Operation>

Figure 3:
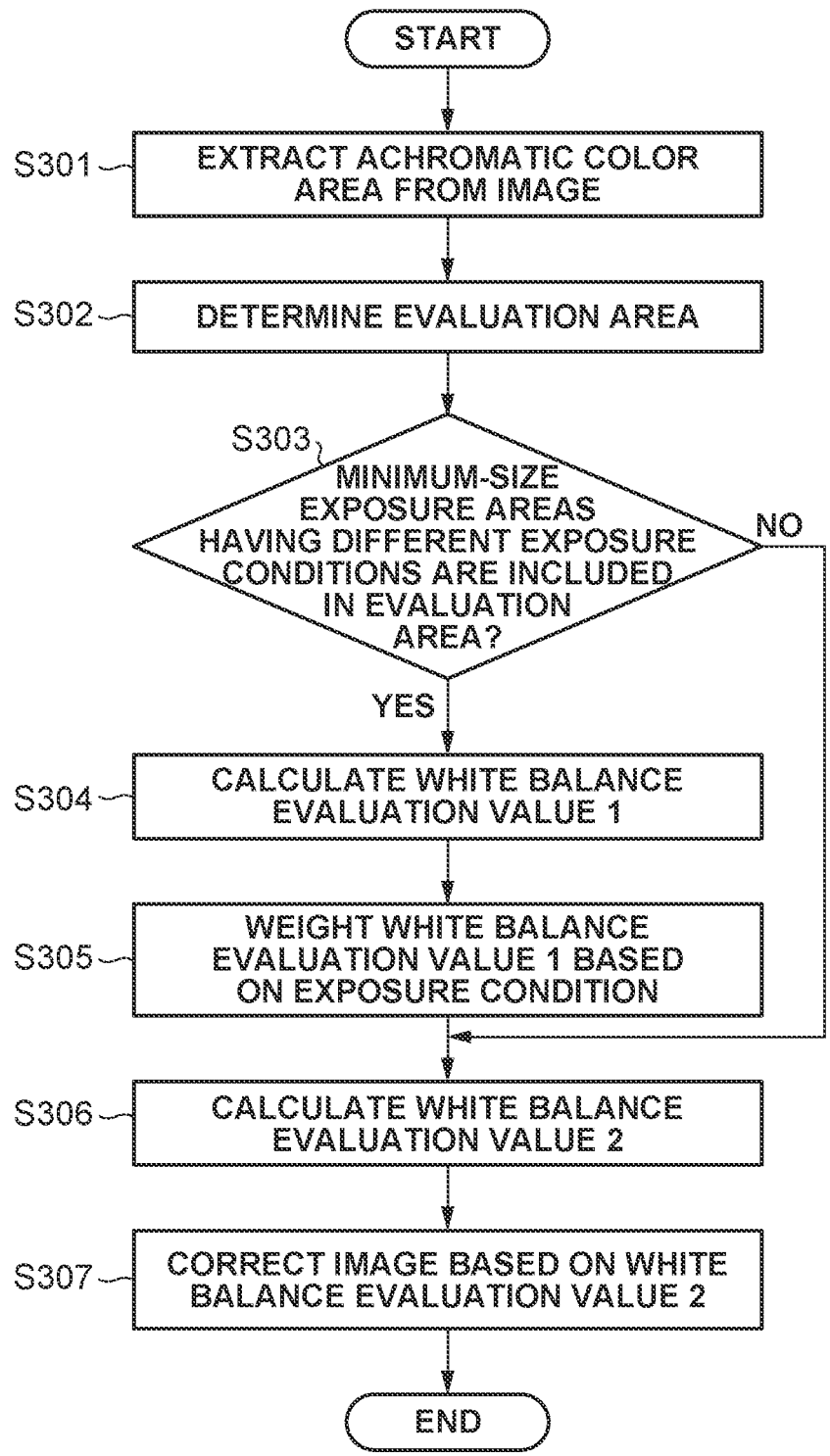
FIG. 3 is a flowchart illustrating an operation of the imaging apparatus according to the first exemplary embodiment of the disclosure.

Next, a white balance (WB) correction according to the present exemplary embodiment will be described with reference to FIG. 3. There are many methods for the WB correction, and in the present exemplary embodiment, a description will be given of a WB correction that uses a method of detecting a white area from an image and determining a white balance evaluation value so as to make the detected image area white. FIG. 3 is a flowchart illustrating white balance correction processing according to the present exemplary embodiment. The flowchart in FIG. 3 illustrates a processing procedure to be performed by a control unit (not illustrated) in the imaging apparatus 100 controlling the processing blocks. The processing procedure is implemented by the control unit loading a program stored in a memory (ROM) included in the control unit into a memory (RAM), and then the CPU in the control unit executing the program to implement the processing illustrated in the flowchart in FIG. 3.

In step S301, the extraction unit 102 extracts an achromatic color area with reference to an image signal digitalized by the image processing unit (not illustrated). Area information regarding the extracted area is output to the area determination unit 103.

In step S302, the area determination unit 103 determines the evaluation area 202 based on the area information output from the extraction unit 102. The area corresponding to all the output area information may be the evaluation area 202, or the area corresponding to a part of the area information may be the evaluation area 202. In a case where all the area extracted by the extraction unit 102 is used as the evaluation area 202, the processing proceeds to step S303 not via step S302. In other words, the extraction unit 102 may be included in the area determination unit 103. Further, a user or a designer may designate the evaluation area 202.

In addition, the evaluation area 202 may be set in an area not including a moving object area. The moving object area is determined as a moving object area in a case where a luminance change amount between frames for each minimum-size exposure area is calculated and the calculated luminance change amount exceeds a threshold. In the moving object area, the exposure time is set to be short (short time exposure) to prevent an image blur of the moving object. On the other hand, in the non-moving object area, it is not necessary to prevent the image blur of the object because no moving object is present therein. Accordingly, the exposure time can be set to be long (long time exposure). Thus, the gain can be set lower as the exposure time is set longer, the signal to noise ratio (SNR) of the non-moving object area is improved, and the evaluation value can be calculated appropriately.

In step S303, the calculation unit 105 refers to the exposure conditions of the pixel groups each corresponding to the minimum-size exposure area 203 in the evaluation area 202 determined in step S302. In a case where the referred exposure conditions are the same exposure conditions (NO in step S303), because it is not necessary to weight the white balance evaluation value 1 for each exposure condition, the processing proceeds to step S306 and the white balance evaluation value 2 is calculated. Then the processing proceeds to step S307. In a case where a minimum-size exposure area 203 having a different exposure condition is included in the evaluation area 202 (YES in step S303), the processing proceeds to step S304.

In step S304, the calculation unit 105 calculates a white balance evaluation value 1 for each minimum-size exposure area 203.

In step S305, the calculation unit 105 weights the white balance evaluation value 1 calculated in step S304, with reference to the exposure condition of the pixel group corresponding to each minimum-size exposure area 203 in the evaluation area 202. The weighting value for each minimum-size exposure area 203 may be determined by preparing a table of weighting values and exposure conditions, or by calculation using the setting value of the exposure condition. In this case, the calculation unit 105 calculates the weighting value.

FIG. 4 illustrates a table for obtaining a weighting value α from an exposure condition G. In a case where the exposure condition G is larger than G1 and smaller than or equal to G2, the weighting value α is A1, and in a case where the exposure condition G is larger than G2 and smaller than or equal to G3, the weighting value α is A2. In this way, a weighting value α is set for each range of the exposure conditions and the weighting value is determined based on the exposure condition. In the case of FIG. 4, the conditions up to the n-th exposure condition are set in such a manner that the weighting value α is An in a case where the exposure condition G is larger than Gn and smaller than or equal to G(n+1).

Formula (1) is used for calculating a weighting value α from an exposure condition X. The following formula (1) is a function that returns a weighting value α when a setting value of an exposure condition G is input. A specific example of the following formula (1) will be described below.

$$\alpha = f(X) \tag{1}$$

In step S306, the calculation unit 105 calculates a white balance evaluation value 2 in the evaluation area 202 by formula (2), using the white balance evaluation value 1 for each minimum-size exposure area 203 calculated in step S304, and the weighting value obtained in step S306.

$$W = \frac{\Sigma(a\_i \times W\_i)}{\Sigma \, \alpha\_i} \tag{2}$$

In formula (2), "W" is a white balance evaluation value 2, and is a calculation result of formula (2). "α" is a weighting value determined from an exposure condition. "i" is a numeral indicating an i-th minimum-size exposure area 203 in the evaluation area 202, and "α_i" is a weighting value determined from an exposure condition of a pixel group corresponding to the i-th minimum-size exposure area 203. "W_i" is the i-th white balance evaluation value 1 calculated in step S304, and corresponds to the i-th minimum-size exposure area 203. The white balance evaluation value 2 can be obtained by a weighted average using the white balance evaluation value 1 calculated in step S304 and the weighting value obtained in step S305. In a case where all the exposure conditions in the evaluation area 202 are the same in step S303, an average value of the white balance evaluation values 1 is calculated as the white balance evaluation value 2 because the white balance evaluation values 1 are not weighted.

In step S307, the correction unit 106 corrects the white balance of the overall image based on the white balance evaluation value 2 calculated in step S306.

The white balance correction processing according to the present exemplary embodiment will be described more specifically with reference to FIG. 5. Assume that the evaluation area 202 includes four minimum-size exposure areas 203, and gain values corresponding to respective pixel groups are 0, 1, −1, and 0. In addition, formula (1) is following formula (3).

$$\alpha = \frac{1}{2^G} \quad (3)$$

In formula (3), "G" indicates a gain value, and in this case, the weighting values for the white balance evaluation values 1 in the minimum-size exposure areas 203 are calculated by the calculation unit 105 as 1, 0.5, 2, and 1.

Here, the weighting value is determined using an analog gain as an exposure condition. However, other exposure conditions such as a shutter speed may be used. If the white balance evaluation values 1 of the corresponding minimum-size exposure areas 203 are W1, W2, W3, and W4, the white balance evaluation value 2 is expressed by formula (4) based on the weighting value α and formula (3).

$$W = \frac{1 \times W1 + 0.5 \times W2 + 2 \times W3 + 1 \times W4}{1 + 0.5 + 2 + 1} \quad (4)$$
$$= 0.22 \times W1 + 0.11 \times E2 + 0.44 \times W3 + 0.22 \times W4$$

The correction unit 106 corrects the white balance of the overall image as described above using the white balance evaluation value 2 calculated as described above.

In the present exemplary embodiment, the case where the evaluation area 202 includes the plurality of minimum-size exposure areas 203 is described. A case where the minimum-size exposure areas 203 do not coincide with the evaluation area 202, will be additionally described. In this case, the size of the evaluation area 202 or the size of the minimum-size exposure areas 203 is changed, by the number of pixels corresponding to the areas of the evaluation area 202 and the minimum-size exposure areas 203 that do not coincide with each other. In this way, the evaluation value can be appropriately calculated because the evaluation area 202 is constituted by a plurality of minimum-size exposure areas 203. In a case where the sizes cannot be changed, the evaluation value excluding pixels of the minimum-size exposure areas 203 that are not included in the evaluation area 202 is to be calculated. Further, for the minimum-size exposure area 203 a part of which is included in the evaluation area 202, the weighting value is changed for each minimum-size exposure area 203 by multiplying the number of pixels in the minimum-size exposure area 203 by the ratio of the number of pixels included in the evaluation area 202. Through the processing, it is possible to appropriately calculate the evaluation value even in a case where the areas of the evaluation area 202 and the minimum-size exposure areas 203 do not coincide with each other.

In one embodiment, the minimum-size exposure area 203 included in the evaluation area 202 does not exceed a range in which the RGB luminance value in the image can be set, specifically, the minimum value or less, or the maximum value or more. In a case where the RGB luminance is the minimum value or less, the exposure amount is increased by changing the exposure condition. In a case where the RGB luminance is the maximum value or more, the exposure amount is reduced. By changing the exposure amount in this way, the evaluation value can be appropriately calculated because image data in which the RGB pixels are not saturated can be used. After calculating the evaluation value, the correction unit 106 corrects the luminance value to correct the changed exposure amount.

According to the present exemplary embodiment, even in a case where a plurality of pixel groups different in exposure condition is included in a white balance evaluation area, it is possible to calculate an appropriate white balance evaluation value. Accordingly, the accuracy of the white balance correction is improved.

In a second exemplary embodiment, a description will be given of a calculation method of a white balance evaluation value different from that in the first exemplary embodiment. In the present exemplary embodiment, a plurality of minimum-size exposure areas in an evaluation area is classified based on respective exposure conditions, and a weighting value is determined for each classification. A functional configuration of the imaging apparatus 100 according to the present exemplary embodiment is similar to that according to the first exemplary embodiment described above. Thus, a description thereof will be omitted.

A description will be given of a method for obtaining a white balance evaluation value of an image according to the present exemplary embodiment with reference to FIGS. 6, 7, and 8.

Figure 6:
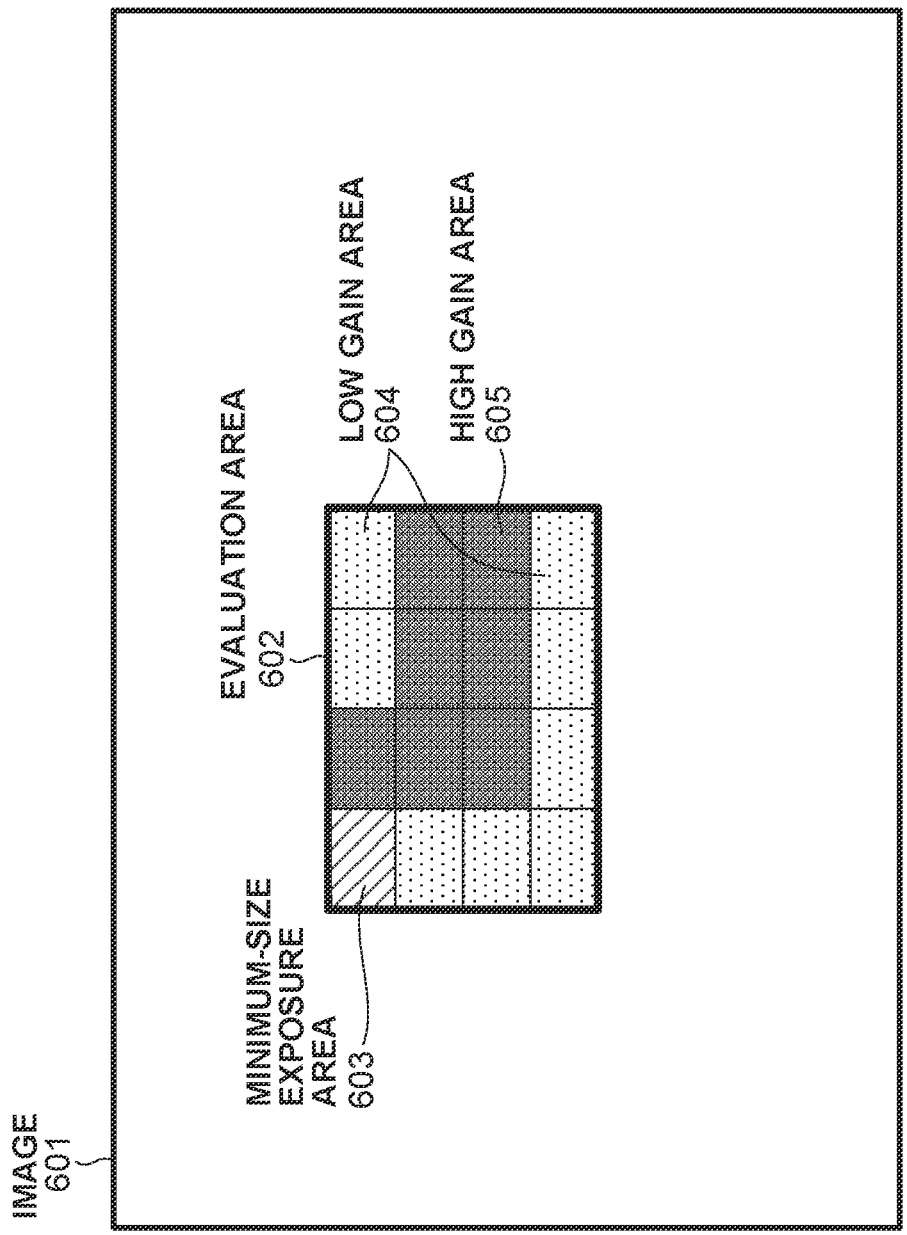
FIG. 6 is a diagram illustrating an image captured by an imaging apparatus according to a second exemplary embodiment of the disclosure.

FIG. 6 is an example of an image captured by the imaging apparatus 100 according to the present exemplary embodiment. In an image 601, an evaluation area 602 is determined as in the first exemplary embodiment. A plurality of minimum-size exposure areas 603 is included in the evaluation area 602, and in the present exemplary embodiment, a case where exposure conditions in the minimum-size exposure areas 603 are different in each area will be described. Low gain areas 604 and high gain areas 605 are determined by classification of the minimum-size exposure areas 603 performed in white balance correction processing described below.

Figure 7:
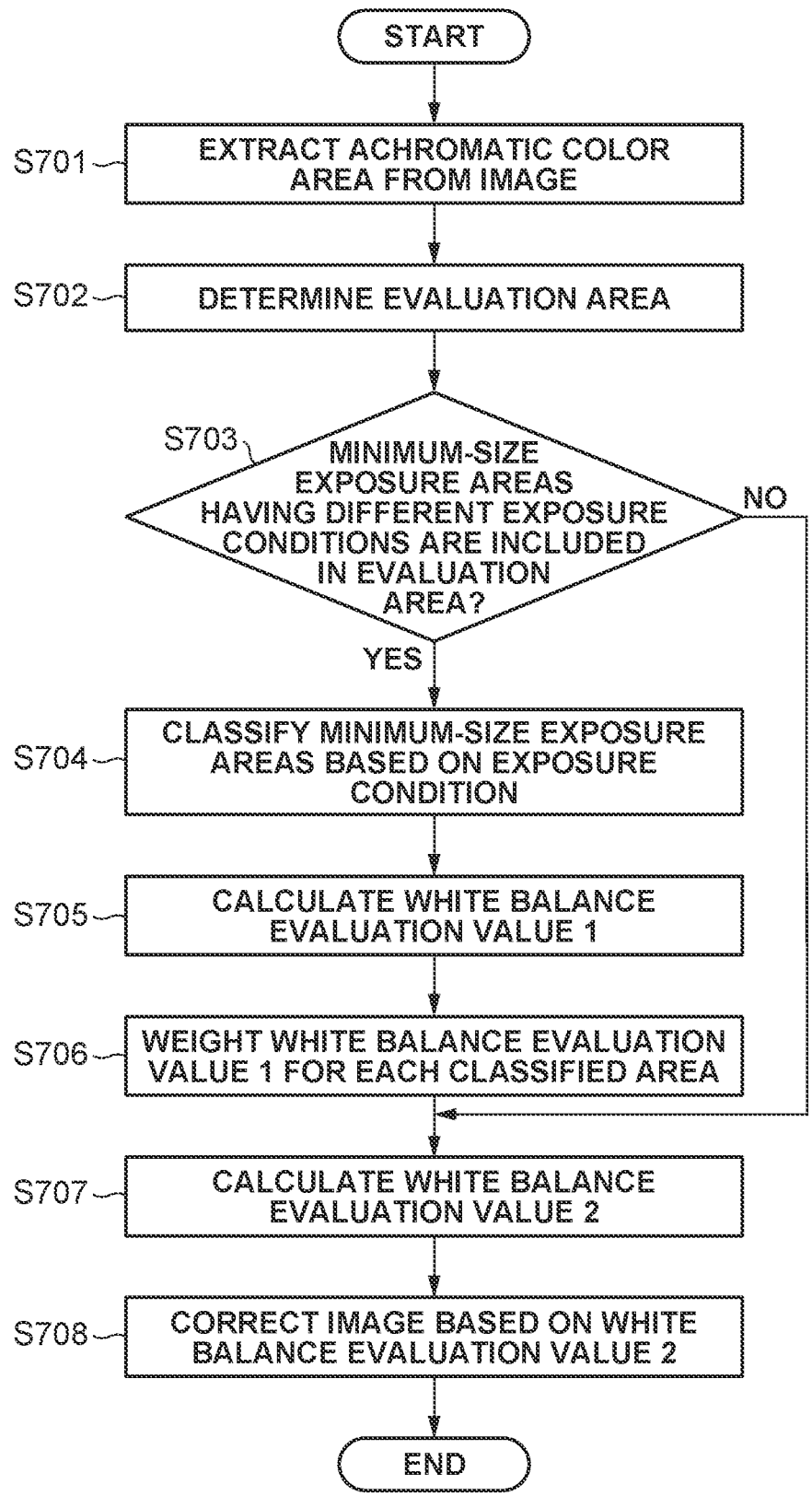
FIG. 7 is a flowchart illustrating an operation of the imaging apparatus according to the second exemplary embodiment of the disclosure.

FIG. 7 is a flowchart illustrating white balance correction processing according to the present exemplary embodiment. In the present exemplary embodiment, processing performed in steps S701, S702, S703, S707, and S708 is similar to that performed in the first exemplary embodiment, and thus a description thereof will be omitted.

In step S704, the minimum-size exposure areas 603 in the evaluation area 602 are classified based on respective exposure conditions of pixel groups corresponding to the minimum-size exposure areas 603. In the present exemplary embodiment, a gain is used as an exposure condition for the classification, but an exposure time may be used. FIG. 6 illustrates the evaluation area 602 after the classification, and the low gain areas 604 indicate minimum-size exposure areas 603 each having a gain lower than a predetermined threshold value, and the high gain areas 605 indicate minimum-size exposure areas 603 each having a gain higher than a predetermined threshold. The areas can be roughly classified into two areas by setting an average value or a median value of analog gains set in the image 601 as the predetermined threshold value. Further, the predetermined threshold value may be an average value or a median value of analog gains settable by the imaging apparatus 100, instead of the setting value in the image 601, or may be set arbitrarily by a designer or a user. Further, in the present exemplary embodiment, the minimum-size exposure areas 603 are classified into two areas using one predetermined threshold value, but may be classified into three or more areas using more than two threshold values. The classified areas in the present exemplary embodiment are called "gain areas".

In step S705, the calculation unit 105 calculates a white balance evaluation value 1 for each classified gain area.

In step S706, the calculation unit 105 weights the white balance evaluation value 1 for each gain area calculated in step S705. The weighting value determined for each gain area illustrated in FIG. 8 may be used, or the weighting value may be determined based on an average value of the exposure conditions of the minimum-size exposure areas 603 in each gain area.

According to the present exemplary embodiment, a use amount of a memory and a load on a CPU for the calculation can be reduced, because the number of times of calculations for calculating the white balance evaluation values 1 and the weighting values thereof can be reduced compared with that in the first exemplary embodiment.

In a third exemplary embodiment, a case where an image includes a plurality of evaluation areas will be described. In the present exemplary embodiment, in a case where a plurality of evaluation areas determined by the extraction unit 102 and the area determination unit 103 is included in the image, the calculation unit 105 calculates a white balance evaluation value 2 for each evaluation area. Next, the calculation unit 105 weights again the white balance evaluation value 2 for each evaluation area, and calculates a white balance evaluation value of the overall image (third evaluation value) to correct the white balance. A functional configuration of the imaging apparatus 100 according to the present exemplary embodiment is similar to that in the first and second exemplary embodiments, and thus a description thereof will be omitted.

Hereinbelow, white balance correction processing in the present exemplary embodiment will be described with reference to FIG. 9.

Figure 9:
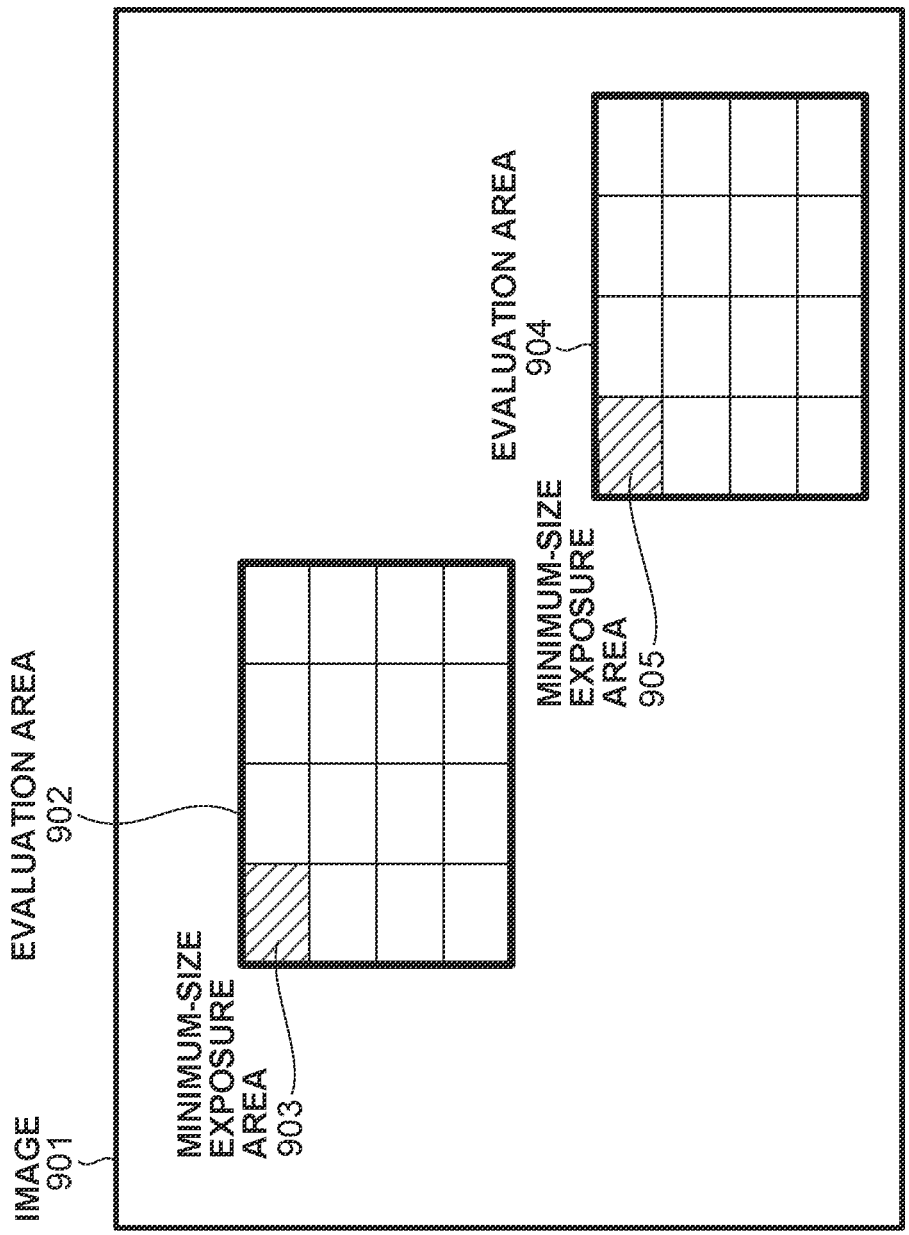
FIG. 9 is a diagram illustrating an image captured by an imaging apparatus according to a third exemplary embodiment of the disclosure.

FIG. 9 is an example of an image captured by the imaging apparatus 100 according to the present exemplary embodiment. An image 901 is an overall image the white balance of which is to be corrected. An evaluation area 902 is one of areas for calculating an evaluation value for correcting the white balance of the image 901. A minimum-size exposure area 903 is a minimum area an exposure condition of which can be set for each area. An evaluation area 904 is an evaluation area different from the evaluation area 902 and is one of the areas for calculating an evaluation value for correcting the white balance of the image 901. A minimum-size exposure area 905 is a minimum area an exposure condition of which can be set for each area in the image sensor 101b. In the present exemplary embodiment, a case where an image includes two evaluation areas will be described. However, three or more evaluation areas may be included in the image. In the present exemplary embodiment, the white balance evaluation value is calculated for each of the evaluation area 902 and the evaluation area 904. The calculation of the white balance evaluation value for each evaluation area is performed in a similar manner to that in the first exemplary embodiment or the second exemplary embodiment, and thus a description thereof will be omitted.

The white balance evaluation value 2 is calculated for each evaluation area. In a case where the calculated white balance evaluation values are the same, as in the first exemplary embodiment or the second exemplary embodiment, it is possible to appropriately correct the white balance of the overall image based on the white balance evaluation value 2. However, it is unusual that two evaluation areas have the same white balance evaluation values, and in general the two white balance evaluation values are different.

In the present exemplary embodiment, a description will be given of a case where the white balance evaluation values 2 are different in the calculated evaluation areas. In this case, the calculation unit 105 weights the white balance evaluation value 2 in each evaluation area again, and calculates a white balance evaluation value of the overall image. More specifically, the calculation unit 105 determines the weighting value to be larger as a standard variation of the RGB luminance values in the evaluation area is smaller for each of the evaluation area 902 and the evaluation area 904. The method of calculating the white balance evaluation value of the overall image after the weighting is similar to that in the first and second exemplary embodiments, and thus a description thereof will be omitted.

According to the present exemplary embodiment, in a case where an image has two evaluation areas, a white balance evaluation value with a high accuracy can be calculated by making the weighting value larger for the evaluation area with more uniform luminance values.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-094252, filed Jun. 4, 2021, which is hereby incorporated by reference herein in its entirety.

What is claimed is:
1. An apparatus comprising:
an image sensor that captures an image of an object;
at least one processor; and
a memory coupled to the at least one processor, the memory storing instructions that, when executed by the at least one processor, cause the at least one processor to:

control an exposure condition including an exposure time or an analog gain for each of a plurality of pixels or pixel groups of the image sensor individually;

determine one or a plurality of evaluation areas including an achromatic color area from the captured image;

calculate a first evaluation value for each of the plurality of pixels or pixel groups in an evaluation area, and calculate a second evaluation value based on the first evaluation value weighted based on the exposure condition for each of the plurality of pixels or pixel groups;

correct the image based on the second evaluation value, wherein the exposure time for each of the plurality of pixels or pixel groups in the evaluation area is controlled to be longer than that for each of the plurality of pixels or pixel groups in an area other than the evaluation area.

2. The apparatus according to claim 1, wherein the instructions further cause the at least one processor to determines the evaluation area so as not to include a moving object.

3. The apparatus according to claim 1, wherein each of the first evaluation value and the second evaluation value is any one of evaluation values regarding a white balance, a hue, and a color saturation.

4. The apparatus according to claim 1, wherein the instructions further cause the at least one processor to corrects a white balance of the image by controlling a digital gain of a plurality of color signals included in the image.

5. The apparatus according to claim 1, wherein the instructions further cause the at least one processor to calculates the second evaluation value by weighting and averaging the first evaluation values.

6. The apparatus according to claim 1, wherein the plurality of pixels or pixel groups in the evaluation area is classified into a plurality of areas based on a threshold value for the analog gain and the first evaluation value is weighted for each classified group.

7. The apparatus according to claim 1,
wherein the plurality of evaluation areas is determined from the captured image; and
wherein the instructions further cause the at least one processor to calculate the second evaluation value for each of the plurality of evaluation areas, and calculates a third evaluation value by weighting and averaging the second evaluation values each weighted based on a standard deviation of luminance values in the plurality of evaluation areas.

8. A method for controlling an apparatus, the method comprising:
capturing an image of an object;
controlling an exposure condition including an exposure time or an analog gain for each of a plurality of pixels or pixel groups individually;
determining one or a plurality of evaluation areas including an achromatic color area from the captured image;
calculating a first evaluation value for each of the plurality of pixels or pixel groups in an evaluation area, and calculating a second evaluation value based on the first evaluation value weighted based on the exposure condition for each of the plurality of pixels or pixel groups; and
correcting the image based on the second evaluation value,
wherein the exposure time for each of the plurality of pixels or pixel groups in the evaluation area is controlled to be longer than that for each of the plurality of pixels or pixel groups in an area other than the evaluation area.

9. The method according to claim 8, wherein the evaluation area does not include a moving object.

10. The method according to claim 8, wherein each of the first evaluation value and the second evaluation value is any one of evaluation values including a white balance, a hue, and a color saturation.

11. The method according to claim 8, wherein a digital gain of a plurality of color signals included in the image is controlled and a white balance of the image is thereby corrected.

12. The method according to claim 8, wherein, in the calculating, the first evaluation values are weighted and averaged, and the second evaluation value is thereby calculated.

13. The method according to claim 8, wherein the plurality of the pixels or pixel groups in the evaluation area is classified into a plurality of areas based on a threshold value for the analog gain, and the first evaluation value is weighted for each classified area.

14. The method according to claim 8,
wherein the plurality of evaluation areas is determined from the captured image; and
wherein the second evaluation value is calculated for each of the plurality of evaluation areas, and the second evaluation values obtained for the plurality of evaluation values and each weighted based on respective standard variations of luminance values in the plurality of evaluation areas are weighted and averaged, and a third evaluation value is thereby calculated.

15. A non-transitory computer-readable storage medium storing a program for causing a computer to execute a method, the method comprising:
capturing an image of an object;
controlling an exposure condition including an exposure time or an analog gain for each of a plurality of pixels or pixel groups individually;
determining one or a plurality of evaluation areas including an achromatic color area from the captured image;
calculating a first evaluation value for each of the plurality of pixels or pixel groups in an evaluation area, and calculating a second evaluation value based on the first evaluation value weighted based on the exposure condition for each of the plurality of pixels or pixel groups; and
correcting the image based on the second evaluation value,
wherein the exposure time for each of the plurality of pixels or pixel groups in the evaluation area is controlled to be longer than that for each of the plurality of pixels or pixel groups in an area other than the evaluation area.

16. The non-transitory computer-readable storage medium according to claim 15, wherein each of the first evaluation value and the second evaluation value is any one of evaluation values including a white balance, a hue, and a color saturation.

17. An apparatus comprising:
an image sensor that captures an image of an object;
at least one processor; and a memory coupled to the at least one processor, the memory storing instructions that, when executed by the at least one processor, cause the at least one processor to:

control an exposure condition including an exposure time or an analog gain for each of a plurality of pixels or pixel groups of the image sensor individually;

determine one or a plurality of evaluation areas including an achromatic color area from the captured image;

calculate a first evaluation value for each of the plurality of pixels or pixel groups in an evaluation area, and calculate a second evaluation value based on the first evaluation value weighted based on the exposure condition for each of the plurality of pixels or pixel groups; and correct the image based on the second evaluation value, wherein an analog gain of each of the plurality of pixels or pixel groups in the evaluation area is controlled to be lower than that of each of the plurality of pixels or pixel groups in an area other than the evaluation area.

18. A method for controlling an apparatus, the method comprising:

capturing an image of an object;

controlling an exposure condition including an exposure time or an analog gain for each of a plurality of pixels or pixel groups individually;

determining one or a plurality of evaluation areas including an achromatic color area from the captured image;

calculating a first evaluation value for each of the plurality of pixels or pixel groups in an evaluation area, and calculating a second evaluation value based on the first evaluation value weighted based on the exposure condition for each of the plurality of pixels or pixel groups; and correcting the image based on the second evaluation value, wherein the analog gain of each of the plurality of pixels or pixel groups in the evaluation area is controlled to be lower than that of each of the plurality of pixels or pixel groups in an area other than the evaluation area.

* * * * *